(12) United States Patent
Pelletier

(10) Patent No.: US 7,776,373 B2
(45) Date of Patent: Aug. 17, 2010

(54) APPARATUS AND METHOD FOR THE ENHANCEMENT OF FOOD PROPERTIES AND FOOD PREPARED THEREFROM

(75) Inventor: Peter Robert Pelletier, Scottsdale, AZ (US)

(73) Assignee: Eteka LLC, Scottsdale, AZ (US)

( * ) Notice: Subject to any disclaimer, the term of this patent is extended or adjusted under 35 U.S.C. 154(b) by 1047 days.

(21) Appl. No.: 11/235,399

(22) Filed: Sep. 26, 2005

(65) Prior Publication Data

US 2006/0110504 A1  May 25, 2006

Related U.S. Application Data

(60) Provisional application No. 60/629,831, filed on Nov. 19, 2004.

(51) Int. Cl.
*A23L 3/32* (2006.01)
(52) U.S. Cl. .................................. 426/237; 426/239
(58) Field of Classification Search .................. 426/237
See application file for complete search history.

(56) References Cited

U.S. PATENT DOCUMENTS

| | | | |
|---|---|---|---|
| 4,018,908 A | 4/1977 | Gross | |
| 4,750,100 A | 6/1988 | Ragsdale | |
| 5,098,843 A | 3/1992 | Calvin | |
| 5,273,525 A * | 12/1993 | Hofmann | 604/21 |
| 5,776,529 A | 7/1998 | Qin et al. | |
| 5,869,326 A | 2/1999 | Hofmann | |
| 5,983,131 A | 11/1999 | Weaver et al. | |
| 6,022,316 A * | 2/2000 | Eppstein et al. | 600/309 |
| 6,103,084 A | 8/2000 | Uhen | |
| 6,300,108 B1 | 10/2001 | Rubinsky et al. | |
| 6,412,398 B1 * | 7/2002 | Norcross et al. | 99/342 |
| 6,520,950 B1 | 2/2003 | Hofmann et al. | |
| 6,593,130 B1 | 7/2003 | Sen et al. | |
| 6,692,783 B2 | 2/2004 | Hunter | |
| 6,714,816 B1 | 3/2004 | Heller et al. | |
| 2003/0170898 A1 * | 9/2003 | Gundersen et al. | 435/461 |

OTHER PUBLICATIONS

Encyclopedia of Food Microbiology, vols. 1-3. Copyright 2000 by Elsevier, Edited by Robinson, Richard K. pp. 1456-1462.*
K. H. Schoenbach et al. "Bioelectrics—New Applications for Pulsed Power Technology," IEEE Transactions on Plasma Science, vol. 30, No. 1, Feb. 2002.
Kang Cheng "A Biomechanical Model of Electroporation of a Biological Membrane," Mckay Laboratory, 424 Stemmler Hall, University of Pennsylvania, PA 19104, 1997 IEEE.
G. Tresset et al. "A Microfluidic Device for Electrofusion of Biological Membranes," The University of Tokyo, Japan, 2004 IEEE.
Els A. van der Wouden et al. "Approaches and Methods in Gene Therapy for Kidney Disease," Science Direct, Journal of Pharmacological and Toxicological Methods 50 (2004) 13-14, 2004 Elsevier Inc.
K. H. Schoenbach et al. "Biological/Medical Pulsed Electric Field Treatments," Norfolk, VA, 2000 IEEE.
Marie-Pierre Rols et al. "Control by ATP and ADP of Voltage-Induced Mammalian-Cell-Membrane Permeabilization, Gene Transfer and Resulting Expression," Institut de Pharmacologie et de Biologie Structurale du CNRS, Toulouse, France.
W. C. Simon et al. "Comparison of Liposome Fusion and Electroporation for the Intracellular Delivery of Nonpermeant Molecules to Adherent Cultured Cells," Journal of Pharmacological and Toxicological Methods 29, 29-35 (1993).
Peter M. Kasson et al. "Computational Simulation of Lipid Bilayer Reorientation at Gaps," Stanford University, CA, Proceedings of the Computational Systems Bioinformatics, 2003 IEEE.
Hideo Matsumura et al. "Ca Ion Permeation Through Liposome Membranes With Heat Generation by Square-Wave Electric Field," Colloids and Surfaces B: Biointerfaces 33 (2004) 243-249.
Alexander Angersbach et al. "Effects of Pulsed Electric Fields on Cell Membranes in Real Food Systems," Department of Food Biotechnology and Food Process Engineering, Berlin University of Technology, Berlin, Germany, Innovative Food Science & Emerging Technologies 1 (2000) 135-149.
Kilian J. Muller et al. "Electrotransfection of Anchorage-Dependent Mammalian Cells," Hamburg, Germany, Experimental Cell Research 288 (2003) 344-353.
Abdel Jemai et al. "Effect of Moderate Electric Field Pulses on the Diffusion Coefficient of Soluble Substances from Apple Slices," International Journal of Food Science and Technology 2002, 37, 73-86.
Meera Kim et al. "Evaluation of Physico-Chemical Characteristics and Microstructure of Tofu Containing High Viscosity Chitosan," International Journal of Food Science and Technology 2002, 37, 277-283.

(Continued)

*Primary Examiner*—C. Sayala
*Assistant Examiner*—Jenna A Watts
(74) *Attorney, Agent, or Firm*—Greenberg Traurig, LLP

(57) ABSTRACT

A method of enhancing food properties by electroporating a food using electrical pulses. The pulses are high-voltage pulses, and the food contains cells that become permeable from the electroporation. The food is exposed to food agents, which diffuse into the food's cells to enhance properties of the food.

20 Claims, 11 Drawing Sheets

OTHER PUBLICATIONS

J.M.S. Renkema "Formation, Structure and Rheological Properties of Soy Protein Gels," Ph.D. thesis, Wageningen University, The Netherlands (2001).

Alenka Macek Lebar et al. "Inter-Pulse Interval Between Rectangular Voltage Pulses Affects Electroporation Threshold of Artificial Lipid Bilayers," IEEE Transactions on Nanobioscience, vol. 1, No. 3, Sep. 2002.

Wanda Krassowska "Macroscopic Model of Electroporating Membrane," Department of Biomedical Engineering, Duke University, Durham NC 27708.

Ljubomic Ilic et al. "Microfabrication of Individual 200 μm Diameter Transdermal Microconduits Using High Voltage Pulsing in Salicylic Acid and Benzoic Acid," The Society for Investigative Dermatology, Inc.

Tian Y. Tsong "Molecular Recognition and Processing of Periodic Signals in Cells: Study of Activation of Membrane ATPases by Alternating Electric Fields," University of Minnesota College of Biological Scient, and Institute of Biomedical Sciences, Academia Sinica, Taipei, Taiwan, Elsevier Science Publishers B.V.

C. Barrau et al. "Osmotically Induced Membrane Tension Facilitates the Triggering of Living Cell Electropermeabilization," Institut de Pharmacologie et de Biologie Structurale-CNRS, Toulouse, France, Bioelectrochemistry 63 (2004) 327-332.

H. Ti Tien et al. "The Lipid Bilayer Concept and Its Experimental Realization: From Soap Bubbles, Kitchen Sink, to Bilayer Lipid Membranes," Journal of Membrane Science 189 (2001) 83-117.

Philip Washbourne et al. "Techniques for Gene Transfer into Neurons," Center for Neuroscience, University of California, 2002 Elsevier Science Ltd.

Yasufumi Kaneda "Virosomes: Evolution of the Liposome as a Targeted Drug Delivery System," Division of Gene Therapy Science, Graduate School of Medicine, Osaka University, Osaka, Japan, Advanced Drug Delivery Reviews 43 (2000) 197-205.

Magnus Gudmundsson et al. "Effect of Electric Field Pulses on Microstructure of Muscle Foods and Roes," Matra Technological Institute of Iceland, Reykjavik, Iceland; Trends in Food Science & Technology 12 (2001) 122-128.

Dietrich Knorr et al. "Processing Concepts Based on High Intensity Electric Field Pulses," Department of Food Biotechnology and Food Process Engineering, Berlin University of Technology, Berlin, Germany; Trends in Food Science & Technology 12 (2001) 129-135.

J. Gehl, "Review: Electroporation: Theory and Methods, Perspectives for Delivery, Gene Therapy and Research," Department of Oncology, Herlev Hospital in University of Copenhagen, Herlev, Denmark; Acta Physiol Scand 2003, 177, 437-447; 2003 Scandinavian Physiological Society.

Jac A. Nickoloff, "Electroporation," University of New Mexico School of Medicine, Albuquerque, New Mexico, Encyclopedia of Life Sciences, 2001 Nature Publishing Group.

Sukhendu B. Dev et al. "Medical Applications of Electroporation," IEEE Transactions on Plasma Science, vol. 28, No. 1, Feb. 2000.

C. Schultheiss et al. "Development of Industrial Electroporation Device," Institut for Pulsed Power and Microwave Technology, Karlsruhe, Germany, 2002 IEEE.

Stephan Roche "Solid State Pulsed Power Systems," Physique & Industrie, France.

Anna O. Bilska et al. "Theoretical Modeling of the Effects of Shock Duration, Frequencey, and Strength on the Degree of Electroporation," Duke University, Durham, NC; Bioelectrochemistry 51 (2000) 133-143.

* cited by examiner

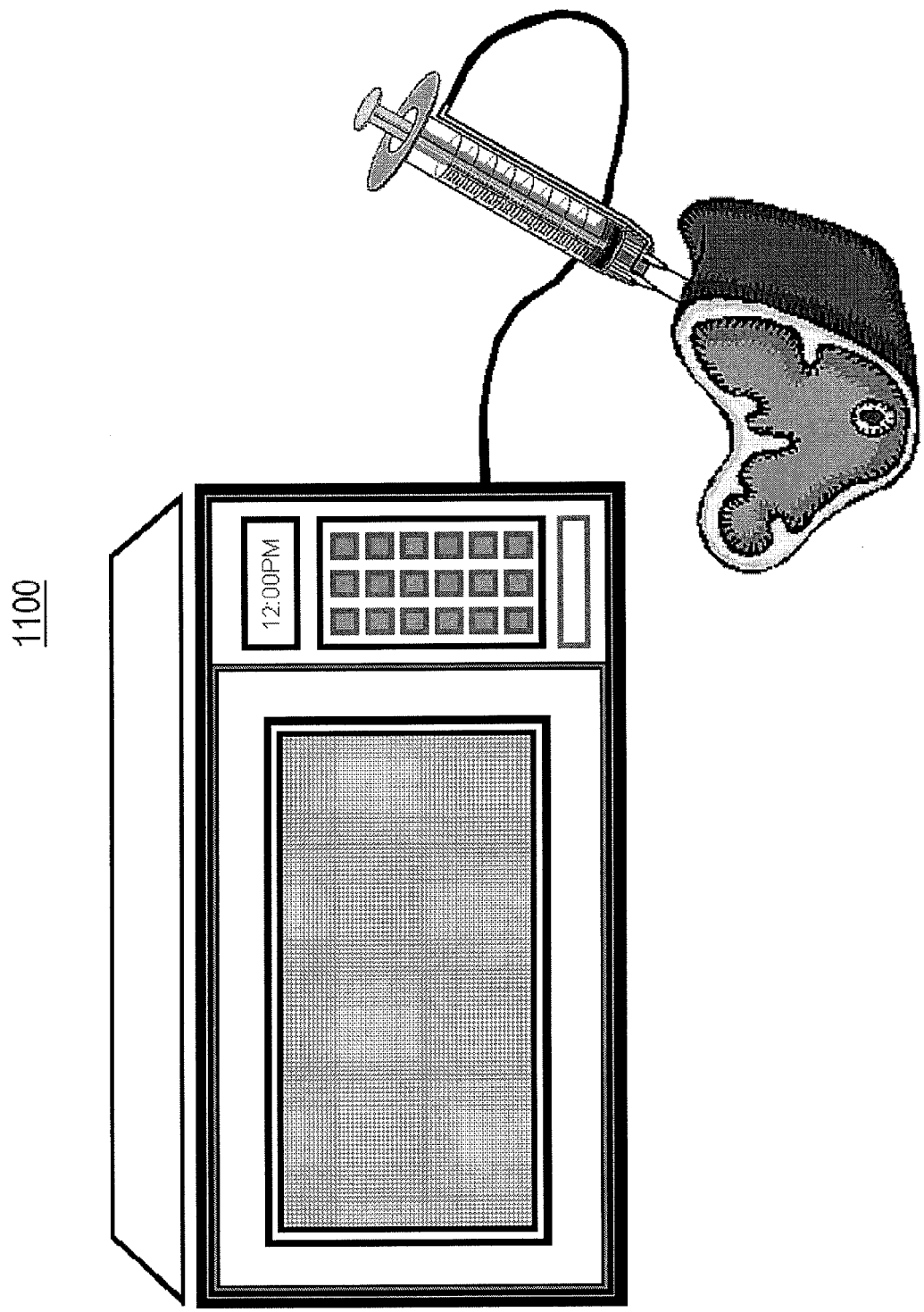

APPARATUS AND METHOD FOR THE ENHANCEMENT OF FOOD PROPERTIES AND FOOD PREPARED THEREFROM

RELATED APPLICATION

This application is a non-provisional application claiming benefit under 35 U.S.C. sec. 119(e) of U.S. Provisional Application Ser. No. 60/629,831, filed Nov. 19, 2004 (titled APPARATUS AND METHOD FOR THE ENHANCEMENT OF FOOD PROPERTIES AND FOOD PREPARED THEREFROM by Peter Robert Pelletier), which is incorporated in full by reference herein.

BACKGROUND

1. Field

The present disclosure generally relates to food processing, and more particularly to electroporation of food.

2. General Background

Various methods have long been used to enhance foods to provide a more enjoyable, and sometimes safer, eating experience for humans or animals. Food enhancement may include a variety of modifications of a food's properties such as, for example, the enhancement or maintenance of flavor, texture, moisture, color, and/or appearance. Examples of such methods include brining, the use of spice and flavor rubs, marinating, tenderizing, and the injection of flavorings and chemicals.

Traditional brining of meat products is known to improve meat flavor and provides moisture control, but has certain drawbacks. For example, brining of large pieces of meat is time consuming. Also, brining an entire turkey can require twelve hours. Large amounts of salt and spices are also required to provide even a modicum of flavoring to the meat, often resulting in waste of the salt and spices. Finally, consumers on a sodium restricted diet typically cannot consume a brined food.

Spice and flavor rubs are used to provide flavor enhancement to foods. However, rubs only provide flavor to the surface of the food rather than a more desired uniform distribution of flavor through the entire food. Rubs also are not effective in controlling the moisture content of the food. Similarly, marinating primarily provides flavor to the surface of the food, and is further a slow and typically messy process.

For meat products, tenderizing tough meat can be accomplished with aging, the use of chemical meat tenderizers such as papan, or by mechanical means. These approaches have drawbacks. For example, aging meat is time consuming, and in the case of beef as an example it can take several weeks to fully age. Other drawbacks include, moisture loss, the increased chance of developing foul flavors from oxidation of unsaturated fats, and the increased chance of contamination from microorganisms, mold growth, and spoiling. A mechanical method of tenderizing meat breaks up the connective tissue to form a more tender piece of meat, but this method cannot provide moisture control or flavor enhancement.

Chemical meat tenderizers, such as papan, function similarly to the natural enzymes in meat, which help soften connective tissue as the meat is aged. However, chemical tenderizers tend to be inactive at refrigerator temperatures, only somewhat effective at room temperature, and inactive above 140° F. Furthermore, chemical tenderizers tend to work on the surface of the meat only, leaving the interior of the meat tough. Overexposure of the meat to papan leads to the breakdown of the connective tissue matrix of the meat and of the protein imbedded in the cell membrane of the cells forming the meat. The proteins are broken down, which undesirably allows additional water to escape through the cell membrane of the meat's cells during cooking, resulting in a drier meat.

Lastly, injection of flavorings and chemicals into a food using a syringe also has drawbacks. For example, for a food such as meat, injection is ineffective in providing a uniform distribution of flavors, and undesirably depends on non-natural chemicals to manipulate properties of the meat.

Accordingly, it is desirable to have an improved method and apparatus for enhancing the properties of food.

BRIEF DESCRIPTION OF THE DRAWINGS

For a more complete understanding of the present disclosure, reference is now made to the following figures, wherein like reference numbers refer to similar items throughout the figures:

FIG. 11 illustrates an electroporation apparatus integrated with a microwave oven employing a syringe food agent delivery system to enhance the properties of cut of meat, according to an exemplary embodiment of the present disclosure.

Figure 1:
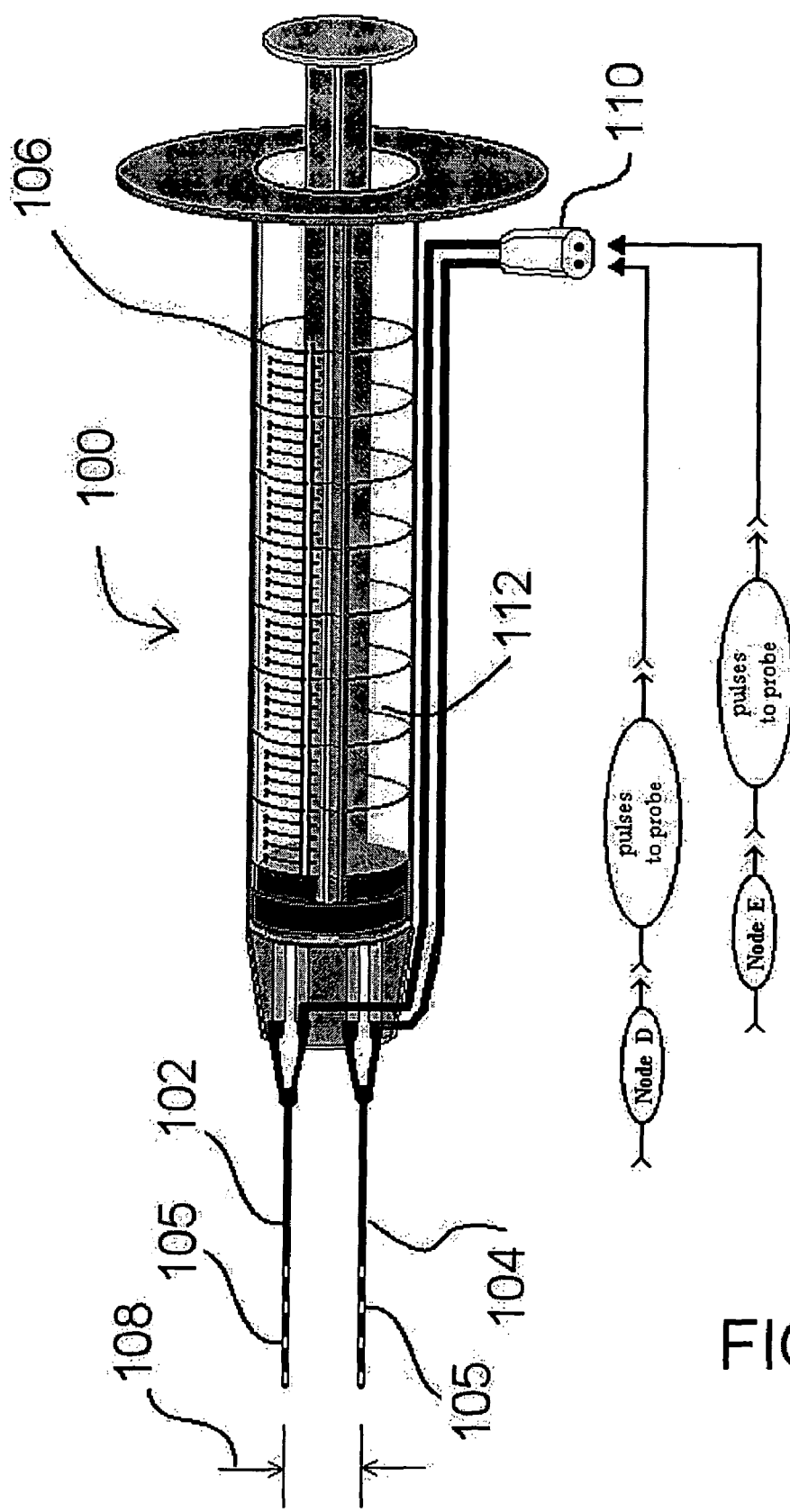
FIG. 1 illustrates an electroporation probe with a syringe food agent delivery system according to an exemplary embodiment of the present disclosure.

The exemplification set out herein illustrates particular embodiments, and such exemplification is not intended to be construed as limiting in any manner.

DETAILED DESCRIPTION

The following description and the drawings illustrate specific embodiments sufficiently to enable those skilled in the art to practice the systems and methods described herein.

Other embodiments may incorporate structural, method, and other changes. Examples merely typify possible variations.

As used herein, the terms "electroporating" and "electroporation" mean applying, or the application of, an electrical pulse, a high-voltage current, or otherwise electrically treating a cell to create openings or pores or other mass transfer paths in its cell membrane for the movement of material into and/or out of the cell. The openings are usually transient (i.e., reversible electroporation), but in certain applications described herein the electroporation may be irreversible. Electroporation includes, but is not limited to, temporarily permeabilising cell membranes to facilitate the entry of large or hydrophilic molecules as in, for example, transfection. A specific example of electroporation is the application of an approximately one-millisecond electrical pulse with electric potential gradients in a food of about 700 V/cm.

As used herein, the term "agent" or "food agent" means any material that affects a characteristic or property of a food. Food properties that may be enhanced by a food agent include, but are not limited to, flavor, color, texture, and moisture content. Food agents may include, but are not limited to, charged ions, water-soluble flavorings, chemicals, salts, spices, sugars, water, fats, and the like that can be transported into the cells of the food to provide enhancement or maintenance of flavor, moisture content, texture, color, aroma, stability, and the like. These agents can be derived, for example, from natural and/or man-made sources including extracts of spice, fruit, vegetables and or natural organisms including those produced using genetically-modified organisms (GMOs) and animals. Chemicals may include all food processing chemicals such as, for example, anti-oxidants, bacterial static chemicals, anti-fungal chemicals, enzymes, stabilizers, emulsifiers, and the like. An agent may be formed from a plurality of the foregoing food agents to provide a food agent solution. The agent may be, for example, administered alone or with a food-safe formulant that, for example, enhances transfection efficiency. Suitable formulants may include, but are not limited to, for example, divalent transition metals, polyanionic compounds, and peptides.

The present disclosure describes a method of enhancing one or more food properties in a food by electroporating the food using electrical pulses. The pulses are typically high-voltage pulses, and the food typically contains cells that become permeable from the electroporation. The food is exposed to food agents, which diffuse into the food's cells to enhance properties of the food.

The present disclosure also describes an electrical pulse generation system that may be used in the electroporation method described herein. For example, this system may form pulses using a cascaded metal-oxide semiconductor field effect transistors (MOSFETs), high-voltage, high-speed pulse forming circuit as described further below. For example, such a circuit may include an electric pulse controller (e.g., a microprocessor); a user-input keyboard and status display output; a variable, high-voltage DC power supply; a means for detecting food parameters for use in controlling electroporation; and probes for delivering the electrical pulses to a food, all as described below. The delivery probes may include means for the delivery of food agents to a food while applying the probes to the food.

Electroporation may be used to facilitate the delivery of food agents such as, for example, charged ions or salts, into the cells of the food more quickly and/or efficiently than prior methods in order to enhance flavor, texture, moisture content, and/or other food properties. The electroporated foods typically may be processed faster than by traditional curing, brining, basting, and marinating methods. Furthermore, the electroporated foods are typically juicier and/or more palatable. As electroporated foods typically contain higher moisture content, they may be more tolerant of cooking at higher temperatures, and thus more readily allow the reduction or elimination of undesirable bacteria and microorganisms in the food.

Foods that typically may be electroporated as described herein include, for example, meat and meat products, vegetable and vegetable products, fruit and fruit products, grains and grain products, and the like. Other examples include combinations of the foregoing foods. Also, electroporation may be used at various stages of food processing.

Foods such as meats, vegetables, and grains are made up of cells, which in turn typically have well-defined cell boundaries. The cell boundaries are typically made up of a lipid bi-layer membrane, which includes phospholipids, with gate-keeping functions that control the passage of water, salts, and the like, in and out of the interior of each cell. For example, the opening of ion channels, essential to the survival of all living cells, is a natural function of the electric potential across the cell membrane. It is believed that this cell membrane function can be controlled or effected to a significant extent using electrical pulses (e.g., high-voltage, short duration electrical pulses). The choice of appropriate electrical pulses permits the transport of food agents and/or out of the cell by, for example, temporarily opening the cell membranes to allow the desired food agents to quickly enter the cell (e.g., via natural diffusion). The cell membrane is usually not destroyed in the process, and the cell membrane is in most cases only temporarily opened. Thus, typically, the food's structure remains substantially intact.

Each food type has different properties and therefore different preferred pulse requirements when electroporated. For example, beef contains more connective tissue and can withstand higher energy pulses than a more delicate meat, such as fish. The high-voltage, narrow-width pulses (e.g., created and controlled by the pulse forming circuits described herein) may be used to control the transport of agents into and/or out of each cell without destroying the overall cell structure.

As an alternative to the temporary opening of the cell membrane as described above, when it is desired for certain applications, higher voltages and longer pulse widths may be used to have a permanent effect on the cell membrane and structure for such applications, for example, as the aging of meat for meat tenderization.

The application of electroporation for accelerated aging of meat does not necessarily require the use of agents. For example, the process of aging beef can be accelerated using electroporation by temporarily opening cell membranes and allowing trapped natural enzymes to flow out of the beefs muscle cells sooner than they would in a conventional aging process without electroporation. The escape of natural enzymes expedites the break-down of the collagen in the connective tissues resulting in a tender meat with or without the use of chemical agents. Electrical pulse parameters like, for example, pulse size, number and duration may be used to control the duration of cell membrane permeability for more precise control over enzyme exodus from the cell.

A food that is to be processed using electroporation may be, for example, pierced by a plurality of electrodes used to apply electrical pulses (discussed in more detail below). These electrodes may also be used to measure selected food characteristics and/or for food agent delivery as discussed further below. Food characteristics of interest are those that may affect the desired pulse parameters used during electroporation. Examples include pH, conductivity, and temperature. It should be noted that the measurement of these characteristics is optional, but typically desirable for pulse control.

Specific pulse parameters may be calculated and selected by a microprocessor (e.g., coupled to a pulse forming circuit as discussed below) based on the measured food characteristics and/or other forms of user or automatic input (e.g., using a key pad). A high-voltage power source (e.g., a DC power source) may be used to power the electrodes under control of a pulse circuit controller (discussed below). The power source may be a dedicated, stand-alone source or a shared source.

The noninvasive impedance measurements of the food may in some cases be used to provide quantitative information regarding the degree of electropermeabilization of cell membranes and their post-pulse recovery (i.e., resealing) kinetics in real-time during the electroporation process. When combined with the food type input provided by the user, this information may permit more rapid determination of the optimum electroporation field pulse parameters suitable for the food type.

The pulse train selected for use (e.g., by the microprocessor) may be sent by a pulse circuit controller to the pulse forming circuit (both discussed further below). The typically smaller pulses of this pulse train may be used as described below to trigger or control the generation by the pulse forming circuit of the larger pulses used to electroporate the food through the electroporation probes.

Soon after the cell membranes are pulsed using the electroporation probes, a charge is believed to develop upon the surface of the cell membranes in the food until the cell membranes are compromised. The cell membrane in the cells of a food is typically a lipid bi-layer predominantly formed of phospholipids. These lipids have a polar phosphate head, which is hydrophilic, and a fatty-acid, non-polar hydrophobic tail. These lipids form a lipid bi-layer as the heads face outwards and the tails face in towards one another to form the lowest energy configuration.

The repulsive electrostatic forces built up on the hydrophilic membrane surface from the electroporation are believed to overcome the van deer Waals forces in some of the weaker locations of the cell membrane. The weak forces attracting the phospholipids hydrophobic tails to each other in these local regions of high charge are not sufficiently strong to hold the lipid bi-layer membrane together during electroporation. The result is the formation of porous locations at the weak spots of the cell membrane. The porous locations provide mass transfer paths for food agents into and out of the cell.

The porous locations formed in the cell membrane typically stay open for a fairly short time (e.g., anywhere from about 30 microseconds to about 8 minutes depending on the electroporation conditions and parameters). The factors that affect the cell membrane's ability to be electroporated and the time that a cell membrane will remain permeable include, for example, the nature of the pulses, the pulse amplitude and duration; the nature of the food, including, for example, its temperature, pH, and the isoelectric point; and the amount of static-charge buildup on the cell membrane. The food may be exposed to one or more pulses as necessary to provide the desired food properties.

Before or after electroporation, food agents (e.g., salts and water-soluble flavorings) may be injected into the food via a delivery means integrated into the electroporation probes (as discussed below) or using separate agent delivery probes (not shown), so that the food agents are present in the extracellular fluid matrix for entry into the cells of the food once a mass transfer path is provided by electroporation. The opened cells will allow the agents in the extracellular fluid that are typically now at higher concentration gradients than the intracellular fluid to naturally transport into the food cells (e.g., by diffusion). In a fairly short time the charge potentials on both sides of the cell membrane reach charge equilibrium. The charge equilibrium results as the concentration between the intracellular and extracellular fluids reaches concentration equilibrium, typically causing the cell membrane to close.

The mechanism for closing the cell membrane is believed to result from the natural interaction of several small forces on the suspended phospholipids. The random thermal Brownian motion of the phospholipids and other molecules that were previously dislocated attract and bond as the van der Waals attractive force becomes greater than the now depleted repulsive electrostatic forces. The result is that the phospholipids substantially line back up to the configuration of lowest energy with the hydrophobic fatty acid tails toward the center of the lipid by-layer and the polar hydrophilic phosphates facing out, thus naturally sealing the cell membrane.

Once the cell membrane has closed, the extracellular fluid may be diluted with a small amount of water. This can be done, for example, through a surface rinse or an injection through one or more of the probes described below. This dilution of the extracellular fluid causes the concentration gradient to be reversed. Higher food agent concentration now is present in the cell, and lower agent concentration is present outside the cell (i.e., in the extracellular fluid). Since the cell membrane is closed and the cell's new contents (i.e., the food agent or agents) cannot be readily transported out of the cell through the cell membrane, substantially the only way that concentration equilibrium can again be reached is if the cells receive more water. Water may enter the cells through osmosis in order for the intracellular fluid to reach concentration equilibrium with the now diluted extracellular fluid. The overall result is that more water, agents, and flavors can be stored within the cells.

When the agents include, for example, mono-valent cations such as sodium ($Na^+$) and/or potassium ($K^+$) cations, or when treatment by a food agent cleaves the hydrogen bridges, ionic, or hydrophobic bonds, then denaturation of the proteins in the cell is possible. What is typically required to cause water-soluble proteins in a food to denature is heating the food to a bulk temperature in the range of 70 to 90° C. (158 to 194° F.) and the presence of these ions in the food cells. The result is that the protein's tight spirals unwind to form a tangled mesh during the heating of the cooking process. This collagen protein becomes a gel mesh that helps the food cells retain water and flavors in the food during the cooking process.

Because the electroporated food retains more moisture, the food can usually be cooked at higher temperatures without compromising moisture and tenderness. For instance, it is recommended that a turkey prepared without electroporation should be cooked to an internal temperature of 165° F. to ensure destruction of food-borne microorganisms. Unfortunately, the high temperature removes a significant amount of moisture from the turkey. An electroporated turkey often can be cooked to temperatures up to 180° F. and still be very moist and flavorful because the gel mesh of proteins acts like a sponge to keep moisture and flavor. The higher temperatures will destroy microorganisms more effectively, with less undesirable impact on food flavor, texture, tenderness and/or moisture content. The higher temperature cooking will generally increase food safety and food quality since higher food temperatures are more effective at killing bacteria.

An exemplary process to enhance the flavor of foods using electroporation includes one or more of the following steps:

selecting the food type; piercing the food with a plurality of probes; optionally measuring food parameters such as pH, temperature, conductivity, and the like; selection of pulse parameters; electroporation of the food; optional injection of food agents; diffusion pause time; and dilution with water to form an electroporated food. The diffusion pause time will depend upon the food type and temperature. A typical pause time may be less than about eight minutes, specifically less than about five minutes, and yet more specifically less than about one minute. The electroporated food can then be packaged, cooked, stored, and/or transported.

Probe Structure

In one embodiment, the step of electroporating may comprise contacting and pulsing the food with an electrode comprising one or more pairs of needle probe electrodes (i.e., one needle to act as an anode and the other needle as a cathode). The needle electrodes may be made, for example, into a grid pattern with alternating polarities. The step of electroporating an entire piece of food may require repositioning of the electrodes.

Electroporating of a food may comprise contacting the food with a first electrode probe pair in a first position and contacting the food with a second electrode probe pair in a second position, and then electrically pulsing the food using both electrode pairs. If more than one electrode pair is used, the steps of contacting may be sequential or simultaneous. The number of pulses may vary depending on food type, average cell size (e.g., diameter), conductivity, temperature and/or pH. Pulse trains may vary in number and duty cycle to minimize joule heating of the food and to maximize electroporation efficiency for each specific food type.

FIG. 1 illustrates an electroporation probe 100 with a syringe food agent delivery system. Needle probes 102 and 104 each may have, for example, a hollow passage with one or more holes or openings 105 to permit delivery of food agent from a fluid reservoir 112 of syringe 106 through needle probes 102 and 104 into a food. Probes 102 and 104 are spaced apart a distance 108. Probes 102 and 104 may be electrically coupled to a pulse forming circuit using electrical socket 110.

Figure 2:
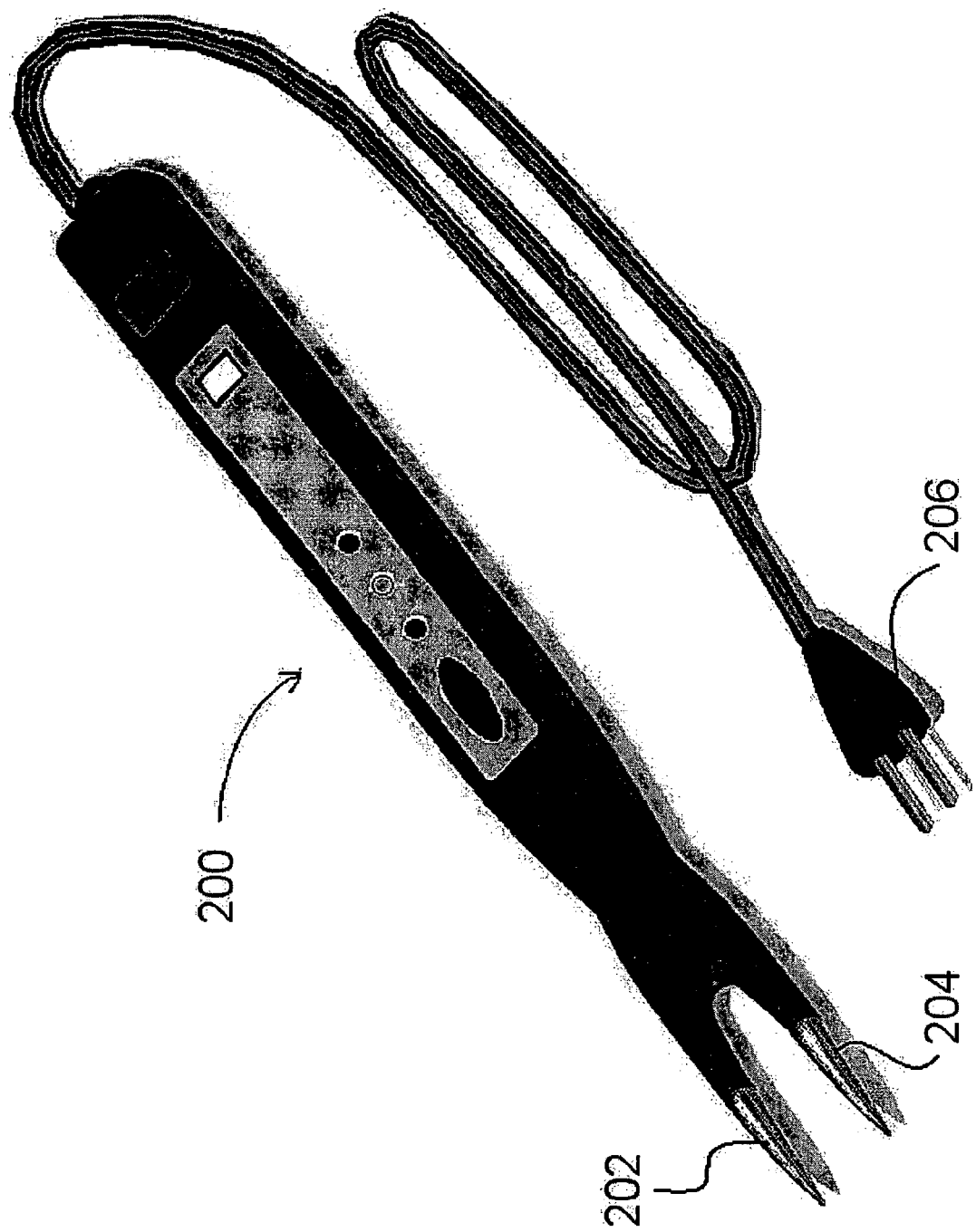
FIG. 2 illustrates an electroporation fork-style probe according to an exemplary embodiment of the present disclosure.

FIG. 2 illustrates an electroporation fork-style probe 200. Probes 202 and 204 contact a food for electroporation. Probes 202 and 204 may be electrically coupled to a pulse forming circuit using electrical socket 206.

Figure 3:
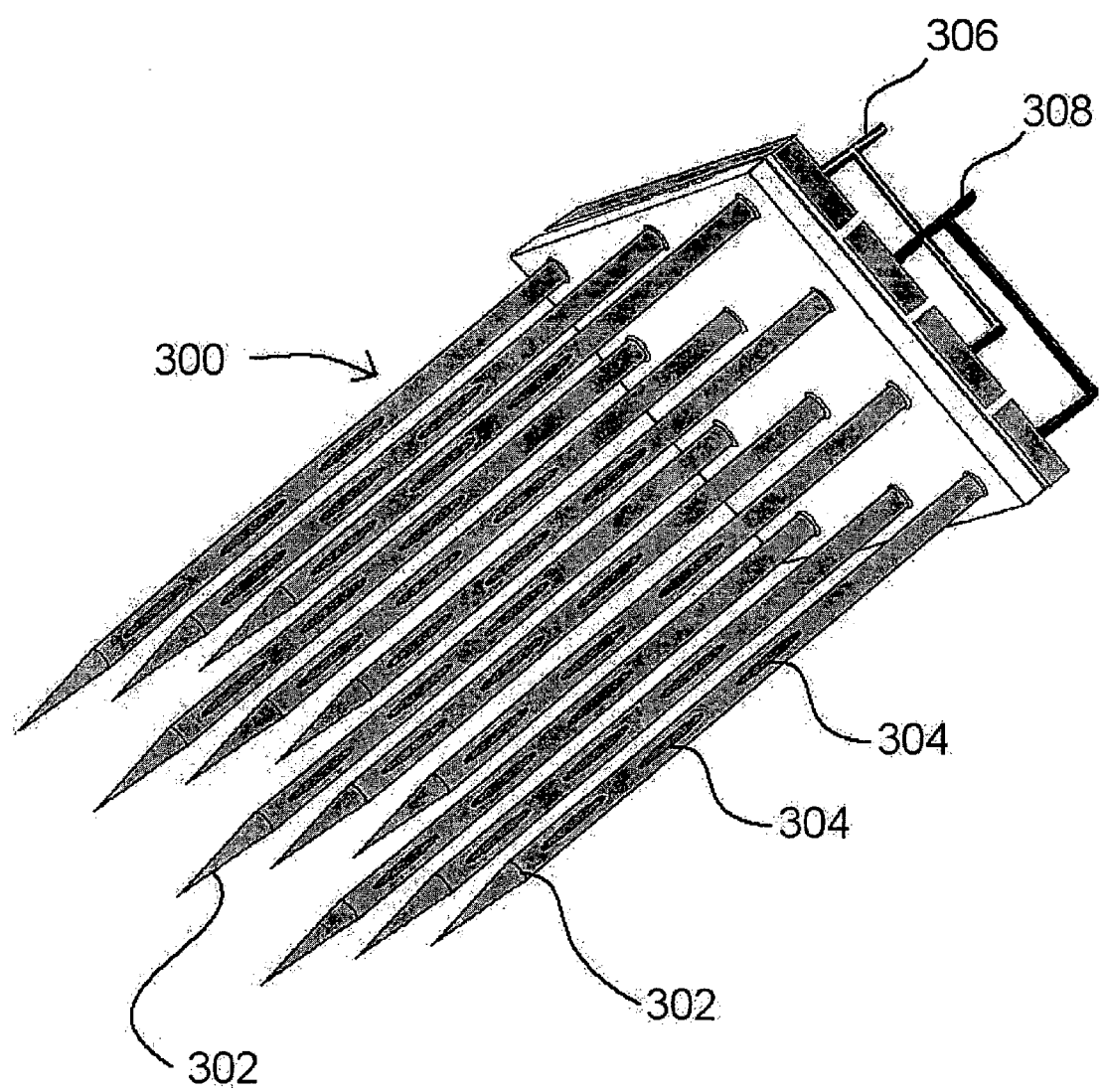
FIG. 3 illustrates an electroporation probe assembly with a plurality of hollow probes, according to an exemplary embodiment of the present disclosure, for use in electroporation.

FIG. 3 illustrates an electroporation probe assembly 300 with a plurality of hollow probes 302 for use in electroporation and delivery of food agent. Many or all of probes 302 may each have one or more openings 304 through which a food agent may flow for delivery to the extracellular environment of a food being processed. Terminals 306 and 308 may be used to electrically couple probes 302 to a pulse forming circuit. Probes 302, and the other probes described above, may be fabricated from a wide variety of materials including, for example, metal, such as stainless steel, as well as a combination of metal and thermoplastics, including polyamides, poly(arylene ether)n, and the like.

As was described above, a food agent delivery means may optionally be included in the probe unit used for applying pulses. The delivery means may be connected to an agent storage tank (not shown) to deliver one or more food agents to the food. Also, a liquid-metering pump (not shown) may be used to accurately control the injection of agents, particularly when used in, for example, industrial applications. The probe unit may also incorporate food parameter measurement. The probes used for electroporation may also be electrically switched for this measurement (discussed in more detail below). Alternatively, separate probes may be used for this measurement.

Electroporation Conditions

Factors to consider in determining suitable electroporation conditions may include electrical properties associated with the electroporation such as the following: electric field strength, pulse duration, pulse number, and pulse frequency. Other factors may include physical and/or chemical properties of the food to be electroporated such as one or more of the following: pH, temperature, and conductivity. One of skill in the art is generally able to select appropriate values for the foregoing factors (see, e.g., Canatella and Prausnitz, Gene Therapy 8:1464 (2001), which is incorporated herein by reference).

Depending on the food type, the electroporation process is more preferred when the food is at refrigerator temperatures of about 1 to 5° C. (34 to 41° F.). However, electroporation also typically works suitably at temperatures of about 5 to 50° C. There is a balance that may be varied between the amount of time the cell membranes remain open and the mobility of the agents to be delivered.

Generally, as the food is cooler, the cell membranes remain open longer. As the food is warmer, the diffusion rate of the concentrated agents into the cells is greater. It is believed possible, but perhaps fairly slow, to electroporate at 0° C. At temperatures above 50° C., the probability of having permanently damaged cells is fairly high. Such high temperatures typically cause poor texture and moisture control. Because of the physical and chemical properties of the food, and that these factors typically affect how the food is shipped and stored, refrigerator temperatures are expected to offer more control of the electroporation process for the enhancement of food properties.

Electroporation typically may be performed more effectively in food with a hypotonic extracellular medium (i.e., a solution having a lower osmotic pressure than a comparison solution). This is believed due to the enhancement by osmotic stress of both electrotransfection and electrofusion efficiency in cells. In addition to osmotic effects, low-conductive media (e.g., media whose conductivity is less than that of the cytosol) is believed to increase the electropermeabilization efficiency of suspended cells due to the transient electrodeformation stretching force exerted on the plasma membrane during the field pulse application.

Compared to concentrated saline medium, low-ionic solutions generally significantly reduce electrolysis, joule heating, and other DC current related phenomena, thus typically reducing or preventing damage to electromanipulated cells and decreasing post-pulse recovery times. The electroporation pulsing step is typically performed before agent delivery in most cases because of the foregoing.

The electrodes used for electroporation (e.g., probes 202 and 204 of FIG. 2) generally emit an electric field strength of less than about 10,000 V/cm. More specific ranges that typically may be used for various foods include, for example, about 1 to 1,000 V/cm, about 25 to 750 V/cm, about 50 to 500 V/cm, about 60 to 300 V/cm, and about 75 to 250 V/cm. Generally, a more desirable electric field strength is greater than about 100 V/cm.

The pulse length may be, for example, from about 1 to 60 ms. More specific ranges include, for example, about 2 to 50 ms, about 4 to 40 ms, about 5 to 30 ms, and about 7 to 25 ms. As a specific example, a suitable electric field strength of about 100 V/cm to 200 V/cm may be used with an electrical pulse length of about 10 to 20 ms. Pulse lengths are generally kept less than 200 ms to minimize permanent cell damage and joule heating.

A suitable number of pulses in a pulse train applied during electroporation is typically from about 1 to 30 pulses (e.g., about 2 to 20 pulses, about 4 to 15 pulses, about 5 to 12 pulses, or about 5 to 6 pulses). The pulse number may also be increased. As the pulse lengths get smaller (e.g., into the nanosecond range), the narrow pulse length typically helps minimize damage from joule heating. Such shorter pulses are typically attainable using a cascaded N-MOSFET circuit as described below. Other known semiconductor-based pulse circuits may be used to provide, suitable, but typically less desirable, 200 ms or longer pulses. These longer pulse lengths are often detrimental to cell membrane recovery and may cause problems with cell leakage and textural problems of the cooked foods.

Mammalian cells like those, for example, of bovine skeletal muscle (beef) are relatively large and are effectively electroporated with low field strengths (e.g., 600 to 800 V/cm), using pulses of, for example, 2 kV amplitude and a wide electrode spacing (e.g., about 2.5 cm). At these modest field strengths, arcing usually does not occur, even in buffers with relatively high ionic strength.

Food Agent Delivery

The food agent or agents may be administered to the food using any suitable means. Suitable methods of administration of the agents to the food, include, for example, injection of the agents into the food using a syringe (e.g. syringe 100 of FIG. 1). Also, note that multiple types of agent delivery systems may be used in combination to deliver agents.

Delivery of the agent may be, for example, via gravity, atmospheric pressure, or an assisted delivery system. Suitable assisted delivery systems include, for example, controlled release pumps, time-release pumps, osmotic pumps, liquid meter pumps and infusion pumps. The particular delivery system or device is not a critical aspect of the process. The infusion rate for delivery of the agent through, for example, each probe tip may be varied. Suitable infusion rates may generally be, for example, from about 0.005 to 1 ml/min, specifically from about 0.01 to 0.8 ml/min, and more specifically from about 0.025 to 0.6 ml/min. One exemplary preferred infusion rate for certain foods is about 0.05 ml/min per probe.

According to the approach described herein, electroporation may be used to enhance the efficiency of agent transfer across the cell membrane. The agent may be administered into the food either before or after the electroporation in preparation for diffusion of the agent into the cells of the food.

The cells of the food may be contacted with more than one electrode probe pair, in which case the contact of the multiple electrode probe pairs may be, for example, simultaneous or sequential. Also, the food may be contacted with the electrodes in multiple positions. For example, the electrodes may be positioned vertically, longitudinally, or horizontally for contacting the food. The electrodes may also be positioned at angles to each other when contacting the food. Suitable angles may include, for example, 45, 60, 75, 90, 120, 160, or 180 degrees.

Usually it is desirable to position the electrodes to ensure that substantially the entire food is exposed to electric pulses. One of skill in the art will appreciate that the position of the electrodes may be adjusted as needed to create an electric field that desirably may extend throughout substantially an entire piece of food during electroporation. As an example, because of the grain of the skeletal muscle in meat, a desirable angle to position the electrode is 90 degrees perpendicular to the food cell grain.

As another example, some skeletal muscle cells have a length of several centimeters with diameters ranging from 10 to 100 micrometers. A definite grain structure is typically observed. Therefore, moving the electrode probe pair(s) every few centimeters along the grain of the food to be treated may optimize the electroporation efficiency. Inserting the probes perpendicular to the grain at regular intervals may also aid in improved speed and coverage.

The food may be contacted with a wide variety of structures of electrodes such as, for example, needles, probes, needles with paddles, needles with rotating paddles, and needles with flat plates or calipers. Electrodes also may comprise an array of multiple needles, probes, needles with paddles, and/or flat plates. Certain methods of electroporation for medical uses, which may be adapted for use with the method described herein, are described in U.S. Pat. Nos. 6,233,482, 6,135,990, 5,993,434, and 5,704,908, which are incorporated herein by reference.

One of skill in the art will appreciate that the space between two needles on any given electrode (e.g., distance 108 shown in FIG. 1) may be varied depending on the electric field (e.g., V/cm) requirement. The space between needles or probes may range, for example, between about 0.1 to 5 cm. Other specific examples include spacings of 0.25, 0.4, 1, or 3 cm. Other configurations of the electrodes or electrode arrays, and other angles or shapes of needle arrays, may be used to meet particular size and access needs. One of the factors used in determining suitable electroporation conditions is the electric field strength. In addition, the probe electrode dimensions are also considered in creating the desired electric fields for electroporation.

Pulse Generation System

Figure 4:
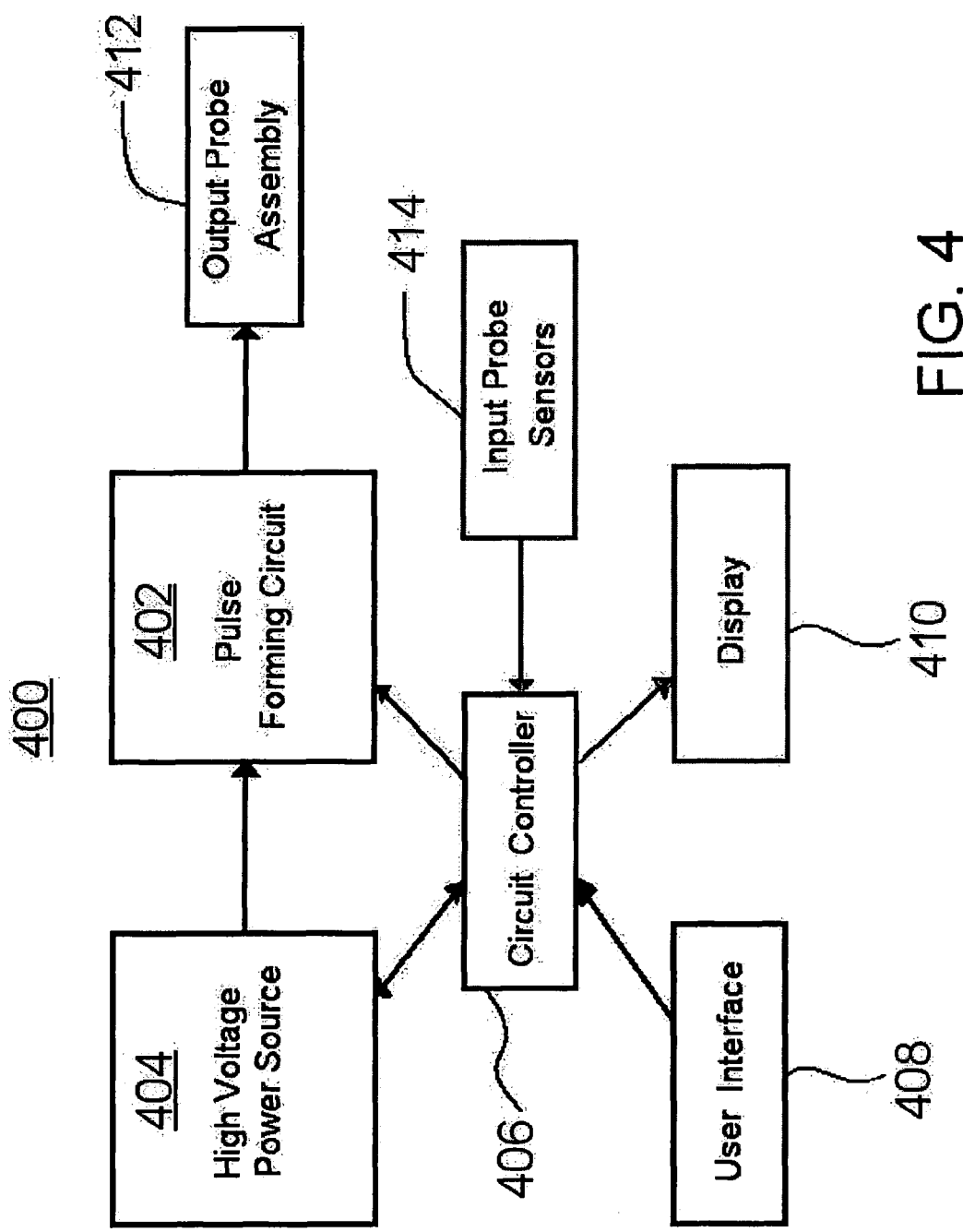
FIG. 4 is a high-level block diagram of a pulse generation system, according to an exemplary embodiment of the present disclosure, that may be used in the electroporation method described herein.

FIG. 4 is a high-level block diagram of a pulse generation system 400 that may be used in the electroporation method described herein. System 400 comprises pulse forming circuit 402 coupled to high-voltage power source 404. A circuit controller 406 controls pulse forming circuit 402. A pulse train of electrical pulses is delivered to a food using output probe assembly 412 (e.g., probe assembly 300 of FIG. 3).

A user interface 408 coupled to controller 406 permits a user to input data regarding food type and other factors to control electroporation. Controller 406 may provide data to display 410 for presenting status and other information to a user regarding the electroporation process. Input probe sensors 414 may provide data from measurements of food characteristics, as was discussed above, for use by controller 406 in controlling the electroporation process.

Figure 5:
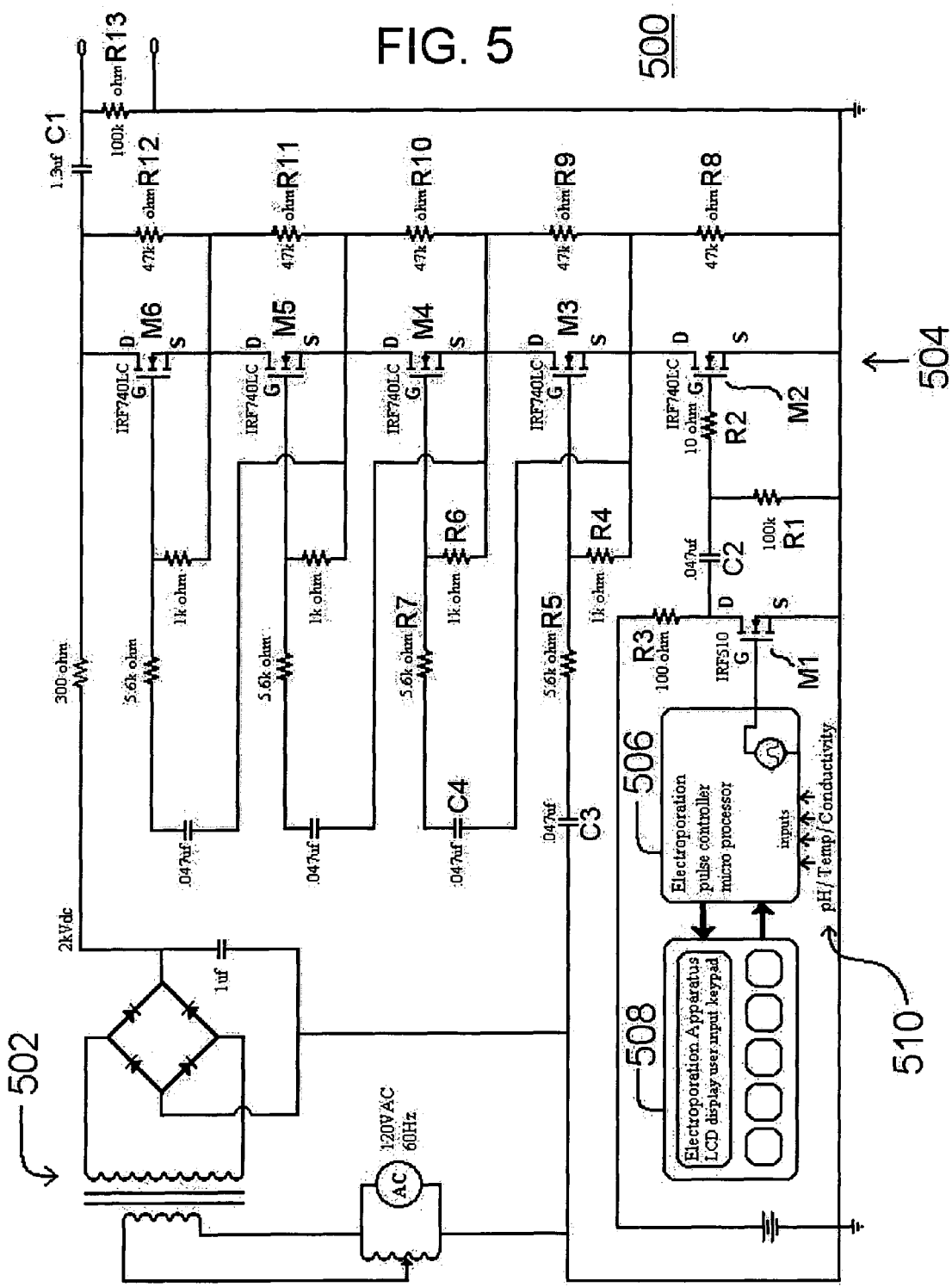
FIG. 5 is a circuit schematic of a pulse generation system having a variable, high-voltage power supply according to an exemplary embodiment of the present disclosure.
Figure 6:
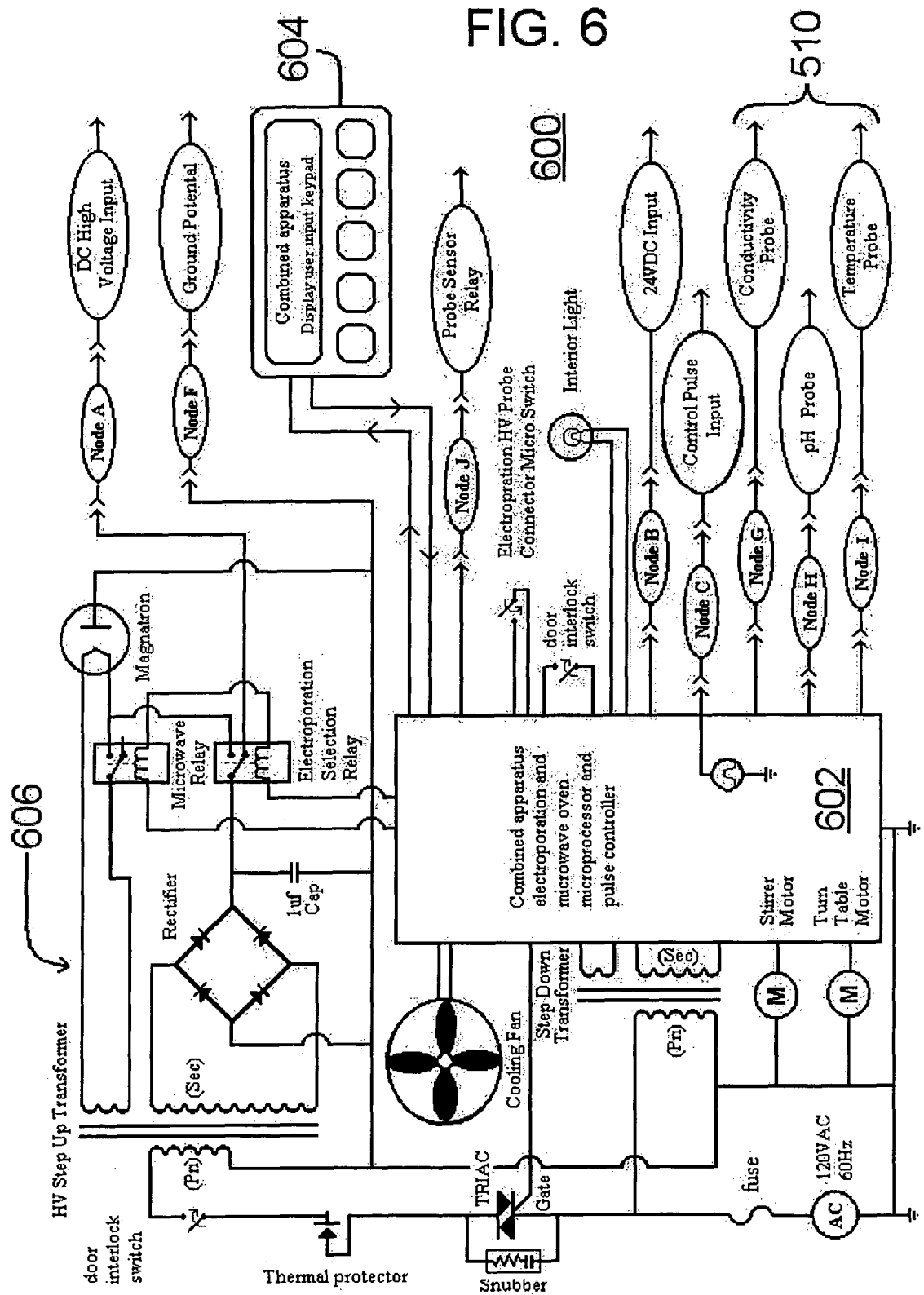
FIG. 6 is a circuit schematic illustrating a pulse generation system integrated with selected components from a conventional microwave oven circuit, according to an exemplary embodiment of the present disclosure.
Figure 7:
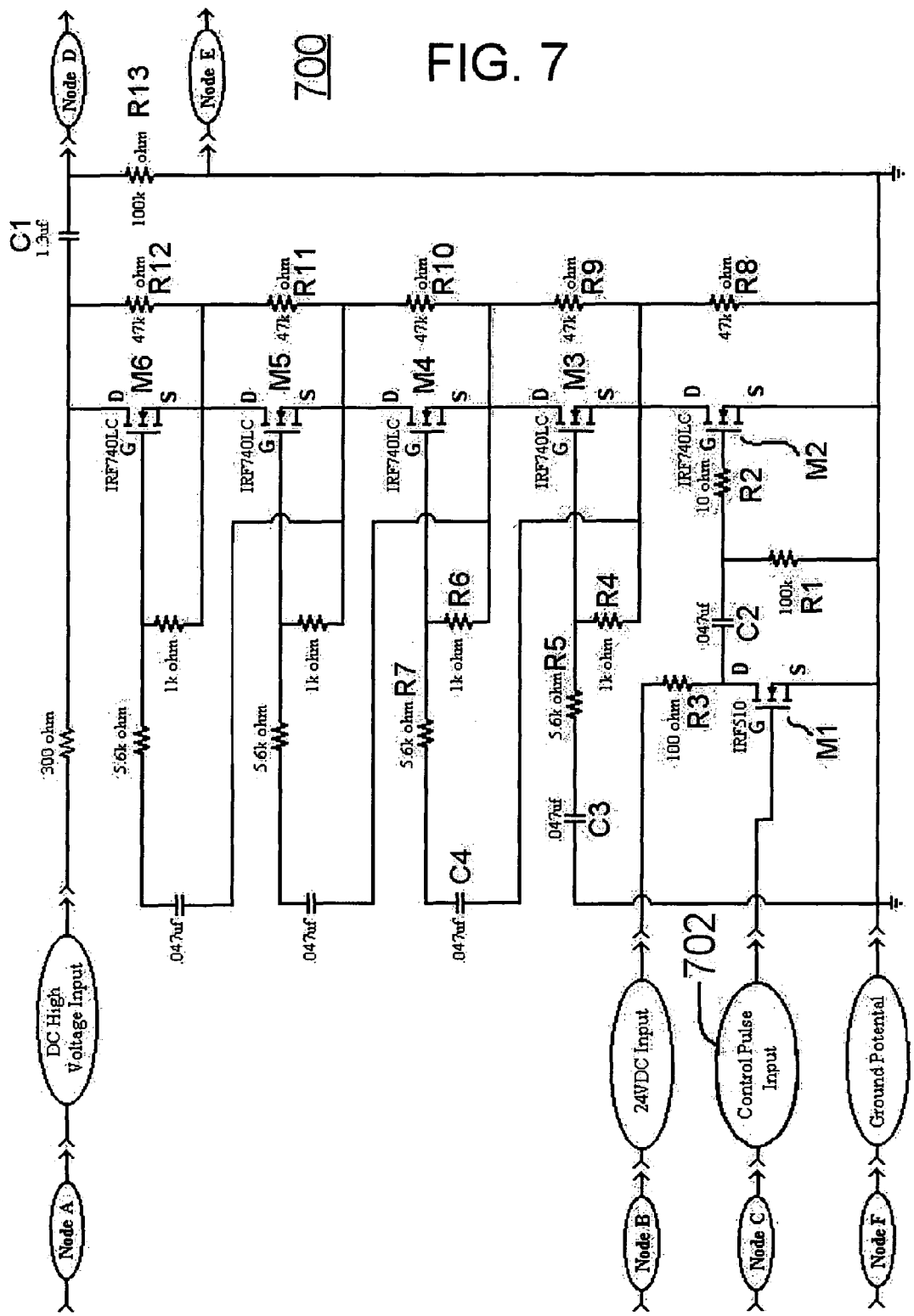
FIG. 7 is a circuit schematic illustrating a pulse forming circuit, according to an exemplary embodiment of the present disclosure, for use in the pulse generation system of FIG. 6.

FIG. 5 is a circuit schematic of a pulse generation system 500 having a power supply 502 (e.g., a variable, high-voltage DC power supply). System 500 may be used, for example, in a stand-alone electroporation apparatus. Pulse forming circuit 504 uses cascaded power MOSFETs. Circuit controller 506 (e.g., a microprocessor) may receive input data from probe sensors (not shown) at sensor inputs 510. It should be noted that specific resistance, capacitance, transistor and other values and types illustrated in FIGS. 5-7 are only provided as specific examples for purposes of illustration and not of limitation.

User interface 508 may be coupled to controller 506 for receiving input from the user of food type (e.g. poultry, fish, beef, soy, etc.) to establish baseline pulse parameters. User interface 508 may include any number of input devices including, for example, a keypad, switches, a touch-screen, or similar input devices.

Status output may be provided on a display provided as part of user interface 508. The display may be coupled to controller 506 and may be, for example, a touch-screen, an LCD (liquid crystal display), a VFD (vacuum florescent display), an LED (light emitting diode) display, or a display device that may include simple status lights or LEDs. The choice of input and status output devices is not critical.

Power supply 502 is coupled to pulse forming circuit 504. Power supply 502 may be, for example, a high-voltage DC power source in the form of a dedicated, stand-alone source or a shared source (e.g., shared with a microwave oven as described below). Power supply 502 provides, for example, a 1 kW, 2 kV DC power supply to pulse forming circuit 504.

After optional user input to establish the type of food and the optional receipt of food parameters at sensor inputs 510, controller 506 generates an output signal in the form of, for example, a pulse train that is provided as an input to pulse forming circuit 504. In response to this input (as described in more detail below with respect to the pulse forming circuit illustrated FIG. 7), pulse forming circuit 504 sends a pulse train of electrical pulses to electroporate a food.

FIG. 6 is a circuit schematic illustrating a pulse generation system 600 integrated with selected consumer appliance components from, for example, a conventional microwave oven circuit. Pulse generation system 600 includes pulse forming circuit 700 of FIG. 7 (discussed later below). Pulse generation system 600 may be included as part of a home appliance (e.g., a microwave oven). Pulse generation system 600 may share, for example, a microwave oven's enclosure (not shown), keypad display 604, controller 602 (e.g., a microprocessor or micro-controller), and high-voltage DC power supply 606. Optionally, in place of a microwave oven's typical single-diode rectifier, a full-bridge rectifier is desirably used. Also, electroporation probe 100 of FIG. 1 may be used with pulse generation system 600.

FIG. 7 is a circuit schematic illustrating a pulse forming circuit 700 for use in pulse generation system 600 of FIG. 6. Pulse forming circuit 700 generally functions as a switch to short a high-voltage source (e.g., a 2 kV DC source) to ground causing a high-current spike through output capacitor C1. This output spike is typically in a nanosecond time range.

An individual MOSFET typically cannot withstand the higher voltages desired to perform electroporation. In order to take advantage of the speed of MOSFETs, while at the same time handling the higher voltages desired for electroporation, pulse forming circuit 700 is configured here as a series, cascaded voltage-divider ladder circuit using MOSFETs. This configuration generally ensures the voltage between the source and drain in each of these series MOSFETs is less than the maximum rated voltage of each device (e.g., the maximum voltage is about 400V DC for an IRF740LC MOSFET). Yet, the sum of the individual MOSFET voltages is large enough to be useful in electroporation (e.g., 2 kV DC).

MOSFETs M2, M3, M4, M5, and M6 (e.g., IRF740LC MOSFETs) are connected in series and may be switched by a cascading effect where each device's activation triggers the next device in series until all have been turned on. Controller 602 of FIG. 6 (providing, for example, a 5V DC control output signal 702 and a 24V DC input voltage) may be used to activate MOSFET M1 (for example, an IRF510 MOSFET). This results in the activation of M2, which pulls the source voltage of M3 to ground potential.

Next, trigger capacitor C3 discharges through a voltage divider formed by resistors R4 and R5. The discharging current from C3 causes a voltage, for example, of approximately 60V DC, across resistor R4 on the gate of M3, causing it to activate. In turn, the activation of M3 makes the source voltage of M4 go to ground potential. The above process continues in turn to activate M5 and M6 (and any other number of MOSFETs or other transistors that may be used in a cascaded series in other embodiments).

Additional aspects of the operation of certain components used in the illustrated embodiments of pulse generation system 500 and pulse forming circuit 700 are now described. Capacitor C1 is a DC blocking capacitor so that substantially only the impulse formed by the switching of the series of MOSFETs M2, M3, M4, etc., passes to the probes (e.g., via Nodes D and E in FIG. 7). Capacitor C2 is a DC blocking capacitor for the gate (G) of M2.

Resistor R1 creates a voltage on the gate of M2 when a current changes in C2 due to the activation of M1. Capacitors C3 and C4 store charge used for triggering the gates on their respective MOSFETs (e.g., C3 stores a gate trigger charge for MOSFET M3). Resistors R4 and R5 form a voltage divider to prevent damage to the gate of M3 during the discharge of capacitor C3. Resistors R6 and R7 operate in a similar role for M4.

Resistors R8 through R12 form a voltage divider to provide over-voltage protection between the drain (D) and source (S) of the respective MOSFETs. For example, R8 protects M2, and R9 protects M3. Resistor R13 functions as a dummy load and a bleed-off resistor. MOSFETs M2 through M6 help provide a faster method of switching a high-voltage to ground to initiate a pulse through capacitor C1 and out to the probes. The other components of the repeated topologies within system 500 and circuit 700 generally operate within their respective sub-topologies similarly as described for the foregoing components.

The high-voltage pulse generated by pulse forming circuit 700 has, for example, a rise time of less than about 40 ns per stage for a total rise time of, for example, about 200 ns.

The speed of pulse forming circuit 700 may be in some cases, for example, about a million times faster than a typical IGBT-based pulse forming circuit. Circuit 700 may permit the use of longer multiple-pulse trains with reduced joule heating of the food and may aid in improved cell membrane recovery. By using several power MOSFETs in series, pulse forming circuit 700 permits the providing of pulses at a fairly rapid rate (e.g., on the order of about 40 ns pulse durations) as a train of narrow-width (e.g., substantially rectangular) pulses.

Although a high-speed, high-voltage pulse forming circuit prepared using MOSFETs has been described above, other semiconductor devices and circuit topologies may be used to create suitable signals for electroporation purposes. There are commercially available pulse forming circuits that would be suitable for electroporation that use other means of switching such as, for example, reed switches, IGBTs (insulated bipolar gate transistors), and air gaps, as well as diodes of various types. In other embodiments, the use of MOSFETs is not required in the pulse generation system.

Figure 8:
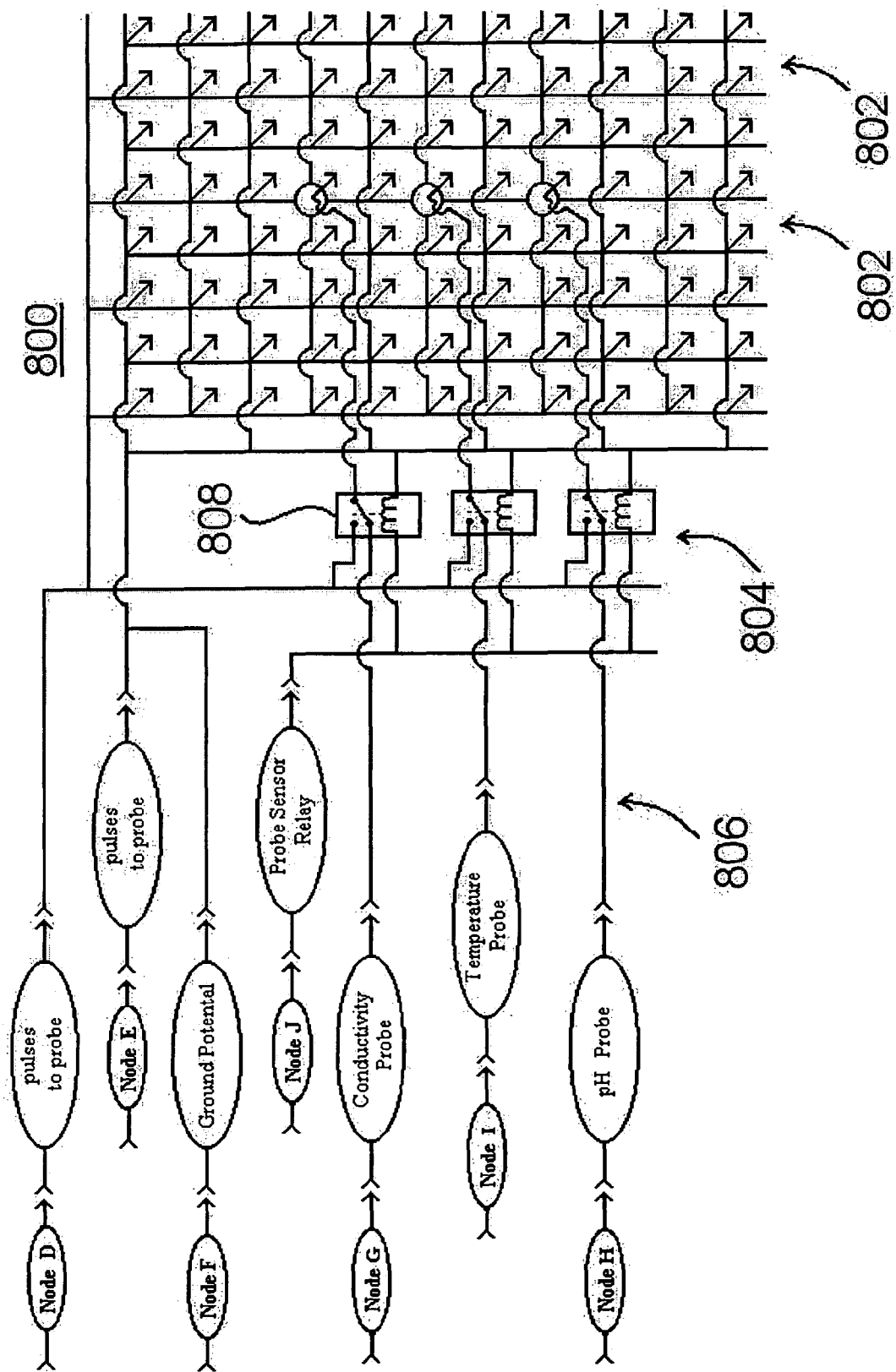
FIG. 8 is a circuit schematic of an electroporation probe assembly having multiple pairs of probes and an isolated sensor circuit with multiple sensors, according to an exemplary embodiment of the present disclosure.

FIG. 8 is a circuit schematic of an electroporation probe assembly 800 having multiple pairs of probes 802 and an isolated sensor circuit 804, which may include one or more sensors 806 (e.g., pH, conductivity, and temperature) for measuring food characteristics as discussed above. Probe assembly 800 may be used with pulse generation system 600. Each of sensors 806 may obtain input from one or more of probes 802, which may be isolated from pulse forming circuit 700 by, for example, relays 808 switched by a probe sensor relay signal from controller 602.

Figure 9:
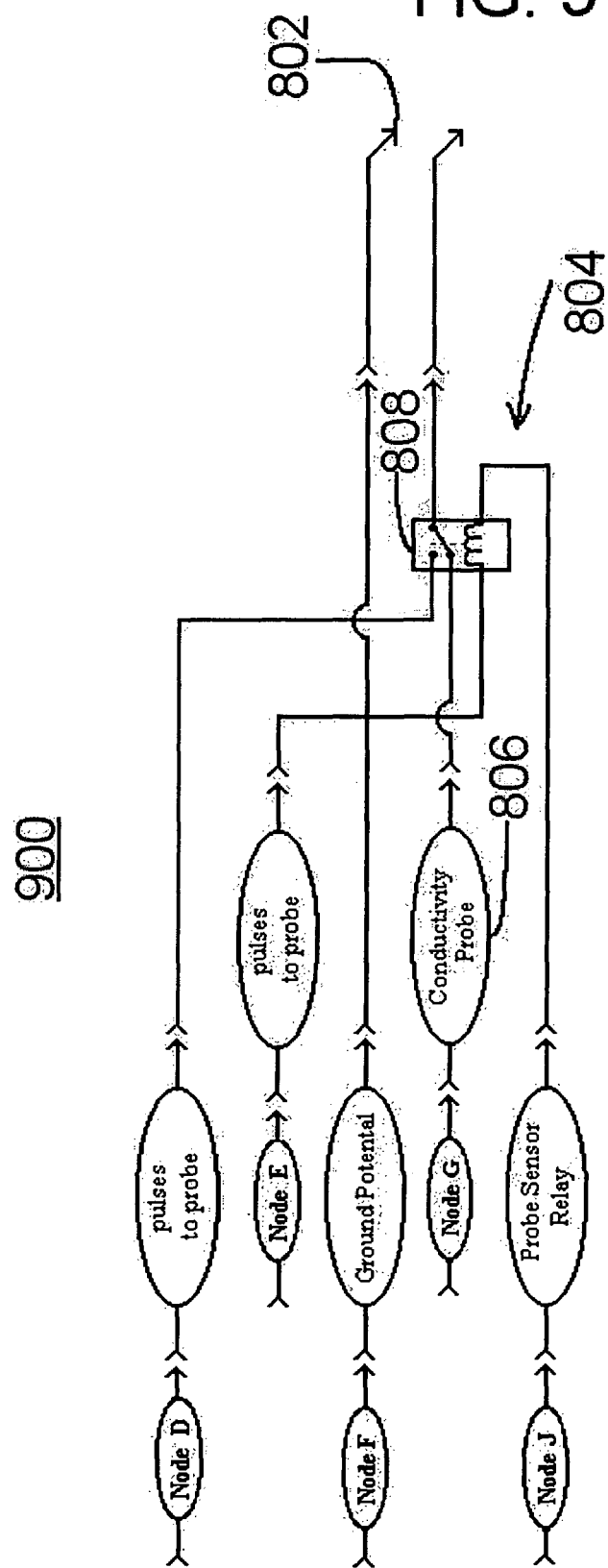
FIG. 9 is a circuit schematic of an electroporation probe assembly having a single pair of probes and an isolated sensor circuit with a single sensor, according to an exemplary embodiment of the present disclosure.

FIG. 9 is a circuit schematic of an electroporation probe assembly 900 having a single pair of probes 802 and an isolated sensor circuit 804 with a single sensor 806. Probe assembly 900 may be used with pulse generation system 600. Relay 808 may be switched by the probe sensor relay signal as discussed above for FIG. 8.

Figure 10:
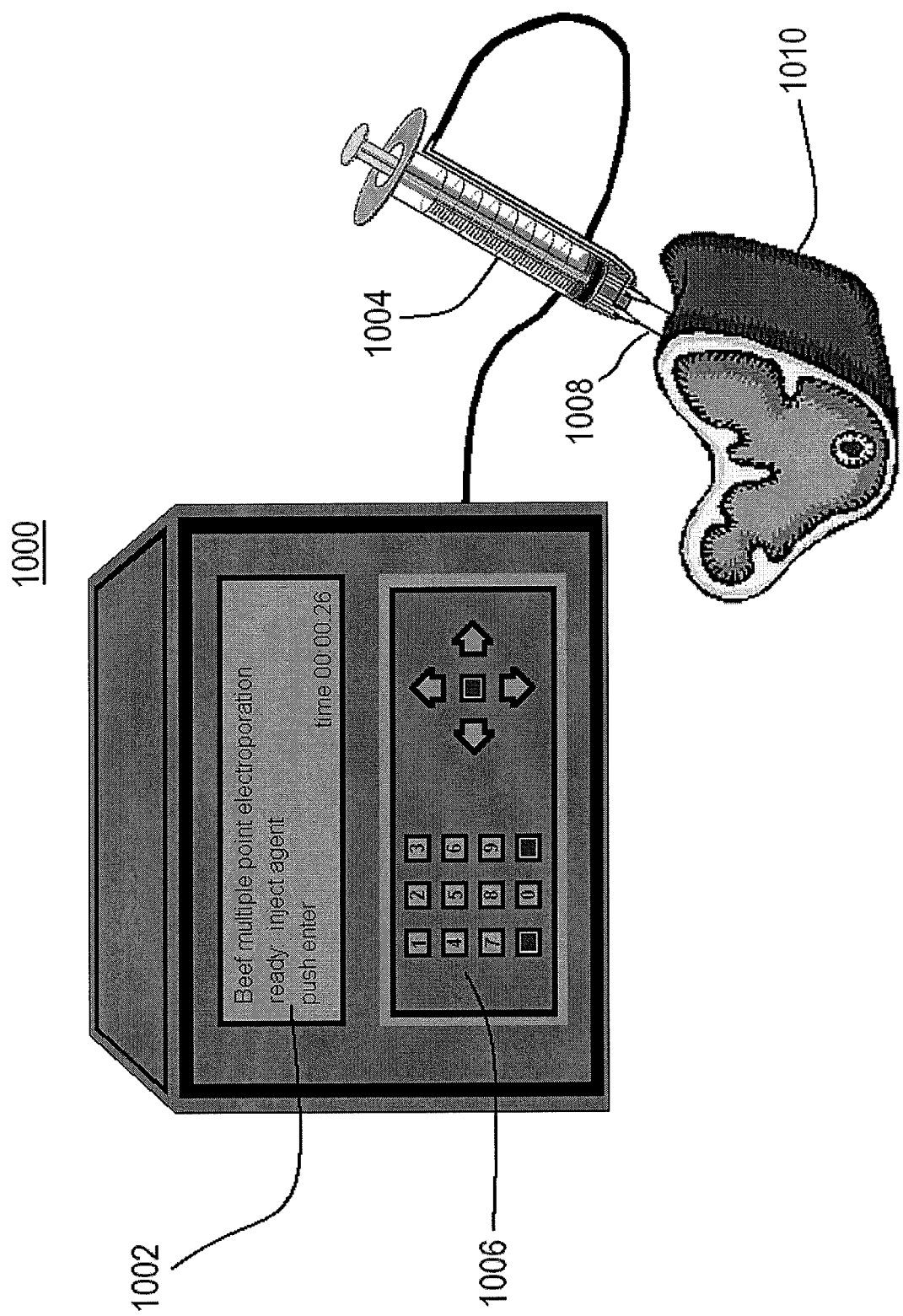
FIG. 10 illustrates an electroporation apparatus with a syringe food agent delivery system enhancing the properties of cut of meat, according to an exemplary embodiment of the present disclosure.

FIG. 10 illustrates an electroporation apparatus 1000 for the enhancement of food properties having a display 1002 and a keypad 1006 as a user interface. An agent is delivered into a meat 1010 using a syringe delivery system 1004. Pulses are administered to the meat by electrodes 1008.

FIG. 11 illustrates an electroporation apparatus integrated with a microwave oven 1100 for the enhancement of food properties (illustrated here as treating a cut of meat).

CONCLUSION

As was discussed above, several properties of food that may be enhanced or maintained by electroporation include, for example, flavoring, coloring, stabilizing, moisture enhancement, texture, and the like. By adding agents to the food using electroporation, the properties of the food cells may be changed both internally and/or externally.

Several food processes may be expedited using electroporation, typically saving both time and money. The processes of aging beef can be accelerated naturally using electroporation by temporarily opening cell walls and allowing trapped natural enzymes to flow out of the muscle cells sooner than in normal aging processes in order to expedite the breakdown of the collagen in the connective tissues. The slow process of brining turkey can be accelerated with increases in tenderness and moisture content. In addition to making juicy, succulent food, the process herein may contribute to an increase in food safety, as the electroporated food may be able to handle higher temperatures that would normally overcook and texturally degrade untreated foods.

The electroporation apparatus described herein may be designed for a variety of applications from a stand-alone handheld probe fork unit, which may be optionally integrated with a microwave oven for a home user, to an integrated, robotic assembly-line electroporation system for mass production in commercial and industrial food-processing plants. Other designs may include, for example, medium-sized, dedicated, stand-alone systems for butcher shops, restaurants, delis, and cafeterias.

In other embodiments, as part of the electroporation process, a food agent may be transferred across the cell membrane at least in part using one or more electric fields. For example, both diffusion and electric fields may be used to aid in this transfer.

The electroporation process and apparatus described above may be used to provide one or more of the following advantages: accelerated food processing, aging, and curing; fast flavor enhancement of foods; moisture control and enhancement of foods; the ability to employ higher cooking temperatures thereby increasing food safety; the ability to provide new methods of agent delivery; the ability to provide rapid agent injection into food cells; and the ability to minimize waste of agents.

By the foregoing disclosure, improved methods and structures for improving food properties by electroporation have been described. The foregoing description of specific embodiments reveals the general nature of the disclosure sufficiently that others can modify and/or adapt it for various applications without departing from the generic concept. For example, the pulse forming circuits described above may be useful in other applications, even those outside of the food processing field, in which high-voltage, shorter duration electrical pulses are desirable. Therefore, such adaptations and modifications are within the meaning and range of equivalents of the disclosed embodiments. The phraseology or terminology employed herein is for the purpose of description and not of limitation.

What is claimed is:

1. A method of enhancing a food property, comprising:
reversibly electroporating a solid food to form an opening in the cell membrane of each of a plurality of food cells of the food, the electroporating comprising piercing a surface of the food with one or more electrodes and applying electrical pulses to the food using the one or more electrodes; and
exposing the food to a food agent so that at least a portion of the food agent transfers into the food through the opening in the cell membrane of each of the plurality of food cells, the exposing the food to enhance the food cells for consumption after cooking of the food, the food agent being suitable to enhance a food property of the food, and the food property selected from the group consisting of texture, flavor, and a combination of the foregoing.

2. The method of claim 1 wherein exposing the food to the food agent precedes electroporating the food.

3. The method of claim 1 wherein exposing the food to the food agent follows electroporating the food.

4. The method of claim 1 wherein:
the electroporating opens a mass transfer path through the cell membrane of each of a plurality food cells in the food; and
the food agent transfers into the plurality of food cells via the mass transfer path.

5. The method of claim 1 wherein the electroporating comprises applying high-voltage electrical pulses to the food.

6. The method of claim 5 wherein the electrical pulses are applied in the form of a pulse train.

7. The method of claim 5 wherein applying the electrical pulses comprises forming the electrical pulses using a pulse forming circuit.

8. The method of claim 7 wherein the pulse forming circuit is a cascaded MOSFET pulse forming circuit.

9. The method of claim 5 wherein the electrical pulses apply an electric field strength to the food of greater than about 100 volts per centimeter and less than about 10,000 volts per centimeter.

10. The method of claim 5 wherein each of the electrical pulses has a length between about 1 to about 60 milliseconds.

11. The method of claim 1 further comprising using the one or more electrodes to detect one or more characteristics of the food prior to the electroporating.

12. The method of claim 11 wherein at least one of the one or more characteristics is selected from the group consisting of: conductivity, resistivity, temperature, and pH.

13. The method of claim 1 wherein the exposing the food comprises delivering the food agent to the food using the one or more electrodes.

14. A method of enhancing a food property, comprising:
reversibly electroporating the cell membrane of each of a plurality of food cells of a solid food to create a mass transfer path across the cell membrane of each of the plurality of food cells, the electroporating comprising piercing a surface of the food with a plurality of electrodes electrically coupled for applying electrical pulses to the food; and
transferring a food agent through the mass transfer path of each of the plurality of food cells to enhance a food property of the food, the food property selected from the group consisting of texture, flavor, and a combination of the foregoing.

15. The method of claim 14 wherein transferring the food agent comprises transferring the food agent into or out of each of the plurality of food cells.

16. The method of claim 14 wherein the food agent is selected from the group consisting of: salt, sugar, water, flavorings, spices, ions, fats, oils, minerals, stabilizers, emulsifiers, tenderizers, transfection agents, and a combination of any of the foregoing.

17. The method of claim 14 wherein the food agent is transferred through the mass transfer path by diffusion.

18. The method of claim 14 wherein the food agent is transferred through the mass transfer path at least in part using one or more electric fields.

19. The method of claim 14 wherein the food agent is transferred through the mass transfer path both by diffusion and using one or more electric fields.

20. The method of claim 14 wherein the food is selected from the group consisting of: a meat or meat product, a fish or fish product, a vegetable or vegetable product, a grain or grain product, and a combination of any of the foregoing.

* * * * *